United States Patent
Blair

(10) Patent No.: US 6,526,444 B1
(45) Date of Patent: *Feb. 25, 2003

(54) USING AN AUTHENTICATION SERVER TO OBTAIN DIAL-OUT INFORMATION ON A NETWORK

(75) Inventor: Dana L. Blair, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/676,023

(22) Filed: Sep. 29, 2000

Related U.S. Application Data

(63) Continuation of application No. 09/074,498, filed on May 8, 1998, now Pat. No. 6,141,687.

(51) Int. Cl.[7] .............................................. G06F 15/173
(52) U.S. Cl. ....................... 709/225; 709/224; 709/229; 709/217; 713/201
(58) Field of Search ................................. 709/225, 224, 709/223, 217, 219, 226, 229; 713/201; 707/3

(56) References Cited

U.S. PATENT DOCUMENTS

| | | | |
|---|---|---|---|
| 5,241,594 A | 8/1993 | Kung | 380/4 |
| 5,655,077 A | 8/1997 | Jones et al. | 395/187.01 |
| 5,684,950 A | 11/1997 | Dare et al. | 395/187.01 |
| 5,752,242 A * | 5/1998 | Havens | 707/3 |
| 5,835,720 A * | 11/1998 | Nelson et al. | 709/224 |
| 5,898,780 A * | 4/1999 | Liu et al. | 713/155 |
| 5,918,016 A * | 6/1999 | Brewer et al. | 709/220 |
| 5,944,824 A | 8/1999 | He | 713/201 |
| 5,974,453 A * | 10/1999 | Anderson et al. | 709/200 |
| 5,991,828 A | 11/1999 | Horie et al. | 710/8 |
| 6,009,103 A | 12/1999 | Woundy | 370/401 |
| 6,026,441 A * | 2/2000 | Ronen | 709/227 |
| 6,091,951 A | 7/2000 | Sturniolo et al. | 455/432 |
| 6,092,196 A | 7/2000 | Reiche | 713/200 |
| 6,141,687 A * | 10/2000 | Blair | 709/225 |
| 6,286,039 B1 * | 4/2001 | Van Horne et al. | 709/221 |
| 6,253,327 B1 * | 6/2001 | Zhang et al. | 713/201 |
| 6,298,383 B1 * | 10/2001 | Gutman et al. | 709/200 |
| 6,301,618 B1 * | 10/2001 | Sitaraman et al. | 709/227 |
| 6,311,275 B1 * | 10/2001 | Jin et al. | 713/201 |
| 6,324,585 B1 * | 11/2001 | Zhang et al. | 709/245 |

OTHER PUBLICATIONS

Carrel, D. et al. The TACACS+ Protocol, Version 1.78, Cisco Systems, Inc., printed from ftp://ftp-eng.cisco.com/gdweber/tac-rfc.1.78.txt on Oct. 23, 2000.

* cited by examiner

*Primary Examiner*—Dung C. Dinh
*Assistant Examiner*—Abdullahi E. Salad
(74) *Attorney, Agent, or Firm*—Thelen Reid & Priest LLP

(57) ABSTRACT

A method for using an authentication server to obtain dial-out information about a network including the steps of receiving a destination network address to the authentication server; obtaining a network number and a corresponding network mask from a database; applying said network mask to said destination network address and comparing the result to said network number; retrieving a profile corresponding to said network number and network mask from a database if said network number matches the result of applying said network mask to said destination network address; and repeating said obtaining, applying, and retrieving steps if said network number does not match the result of applying said network mask to said destination network address.

51 Claims, 2 Drawing Sheets

US 6,526,444 B1

USING AN AUTHENTICATION SERVER TO OBTAIN DIAL-OUT INFORMATION ON A NETWORK

This application is a continuation of Ser. No. 09/074,498 filed on May 8, 1998, now U.S. Pat. No. 6,141,687.

BACKGROUND OF THE INVENTION

1. Field of the Invention

The present invention relates to the field of computer networking. More particularly, the present invention relates to using an authentication server to obtain dial-out information on a network, the dial-out information being used to dial another network for the purpose of forwarding a data packet.

2. The Background Art

There are two general types of dial operations that may be performed by a network. These are dial-in and dial-out. A dial-in operation is performed when a user, or even another network, wishes to gain access to a network. The remote user or network dials the network to connect to it. This dial operation may comprise using a modem and dialing a phone number through the phone company, or it may comprise any other type of network communication, including gaining access through a publicly switched network or similar high speed design. The remote user or network is therefore initiating contact, and the destination network simply performs a passive dial-in operation, which allows it to receive the call.

Many consumers are remote users, wherein they dial an Internet Service Provider (ISP) on their modem and log in to the remote user. There are other types of remote users as well, including users who dial directly into a server, but ISP access is the most popular. The process by which a network authenticates such a user is as follows. During this dial-in operation, when a connection is made, a device known as an access server prompts the user for a username and a password. This username and password is then passed to an authentication server. The authentication server looks up the username in a database which has been indexed by usernames. When it finds the username in the database it retrieves the appropriate password and other relevant information about the user. If either the username or the password is not correct, the user is denied access to the network, otherwise access is granted.

A remote network is most commonly used in telecommuting applications, where the user requires faster access to a network. The network inside the user's house is connected to a publicly switched network. Rather than using a modem, a router or bridge is initiating the connection process. Authentication of a user is accomplished in a similar manner to that of remote users. An authentication server verifies that the remote network should have access using the username and a password.

A dial-out operation provides for the opposite effect of a dial-in operation. Here, the network is initiating connection to a remote network. It is also possible for the network to attempt to connect to a remote user. This connection may be made in an effort to provide access for an extended period of time, such as a first network connecting to a second network for the purpose of performing a search in a database residing on the second network.

Many networks, however, such as the Internet, also use networks simply to forward information to another network. An example of this is depicted in FIG. 1. In FIG. 1, node A 2 on network X 4 passes information to node B 6 on network Z 8. In order to perform this, router 10 must pass the information to router 12. However, network X 4 and network Z 8 are not directly connected, but are instead separated by network Y 14 having router 16. Thus, router 10 must pass the information through router 16 to router 12. Router 16 is called a hop. Router 16 is expected to forward the information to another hop on the network or to the final destination of the information (if possible). Thus, in this example, the IP packet takes one hop to get to its destination.

In order to properly forward the information, a router must examine the intended address of the information, extract the information as to which network it must be forwarded, then look up the network in a database in order to determine how to connect to that network. Generally, this database will contain the phone number or other dial-out information on the appropriate network. In the Internet example depicted in FIG. 1, an access server on network Y 10 extracts the destination IP address from the IP packet that is being sent. It then looks up the address information in the database and retrieves a phone number for network Z 8, which it dials and then forwards the IP packet to that network.

The drawback of this method is that the steps are generally performed by the access server of the network. The access server is intended simply to be a device which connects devices to a network through network and terminal emulation software, not to perform searches on a database. The access server is not scalable and therefore the memory and speed of the access server is limited. Using the access server to look up the dial-out information in a database wastes valuable resources which could be used for network connection. It would be preferable to offload this process to another device. Currently, however, there are no network devices designed to perform this task other than an access server.

BRIEF DESCRIPTION OF THE INVENTION

A method for using an authentication server to obtain dial-out information about a network including the steps of receiving a destination network address; obtaining a network number and a corresponding network mask from a database; applying said network mask to said destination network address and comparing the result to said network number; retrieving a profile corresponding to said network number and network mask from a database if said network number matches the result of applying said network mask to said destination network address; and repeating said obtaining, applying, and retrieving steps if said network number does not match the result of applying said network mask to said destination network address.

DETAILED DESCRIPTION OF THE INVENTION

Those of ordinary skill in the art will realize that the following description of the present invention is illustrative only and not in any way limiting. Other embodiments of the invention will readily suggest themselves to such skilled persons.

Offloading the process of looking up dial out information on other networks from the access server to the authentication server would greatly increase the productivity of the network. The problem with incorporating this process into the authentication server is that authentication servers currently only has the ability to look up profiles based on the username it is passed. When dealing with information which is being passed through a network to a final destination outside the network (i.e. using the network as only a hop), a username is simply not provided within the packets transported to a network. However, the destination address is always provided in such a packet. It is therefore possible to use the destination address with the authentication server to retrieve the dial-out information needed.

Figure 1:
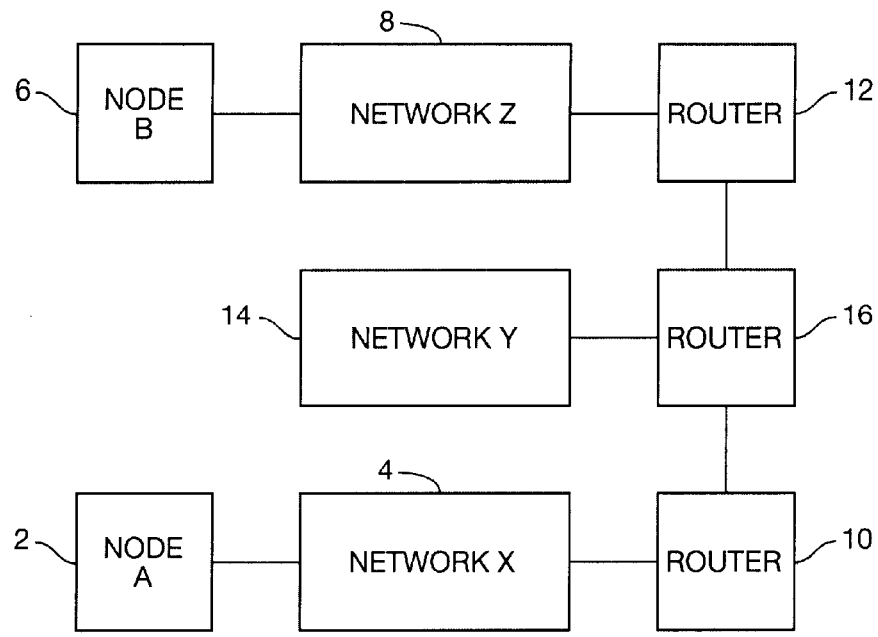
FIG. 1 is a block diagram showing an example of a network having several sub-networks.
Figure 2:
FIG. 2 is a diagram of the general format of a destination IP address.

In the Internet Protocol (IP), destination addresses are generally four octets long. Additionally, they make up two distinct parts: a network portion and a host portion. FIG. 2 depicts how a destination address may contain these parts. The network portion 20 contains a network number, which corresponds to the destination network of the IP packet. Network numbers are assigned when each link on a network is attached. Each of these network numbers is unique to each network. The host portion 22, on the other hand, contains a host number, which corresponds to the precise destination system of the IP packet.

Figure 3:
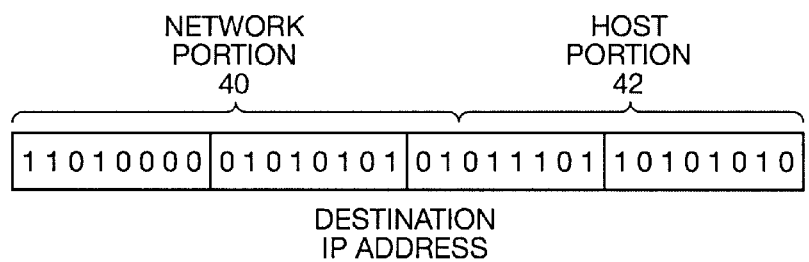
FIG. 3 is a diagram showing an example of a destination IP address.

The network and host portions of a destination IP address may be oriented in any fashion. FIG. 3 depicts the simplest example of their orientation, where the entire network portion 40 comes before the entire host portion 42. The lengths of the network and host portions are variable. Additionally, it is possible to have the network portion and the host portion intermixed within the destination IP address. However, many systems require that the portions be contiguous as non-contiguous portions can lead to ambiguities.

Figure 4:
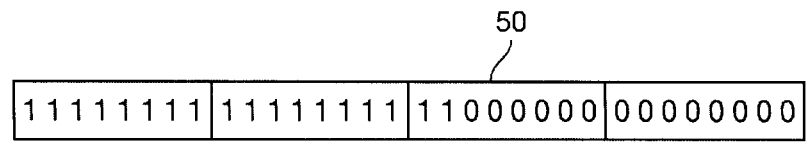
FIG. 4 is a diagram showing an example of a network mask.

In order to split a destination address into its network portion and its host portion, a network mask is used. A network mask is a number which indicates which part of the destination address is the network portion and which part is the host portion. FIG. 4 depicts an example of a network mask. A "1" in a particular bit indicates that the corresponding bit in the destination address is part of the network portion while a "0" in a particular bit indicates that the corresponding bit in the destination address is part of the host portion. In FIG. 4, the network mask 50 contains 18 "1"s followed by 14 "0"s. This indicates that the first 18 bits of the destination address are the network portion and the last 14 bits are the host portion.

Figure 5:
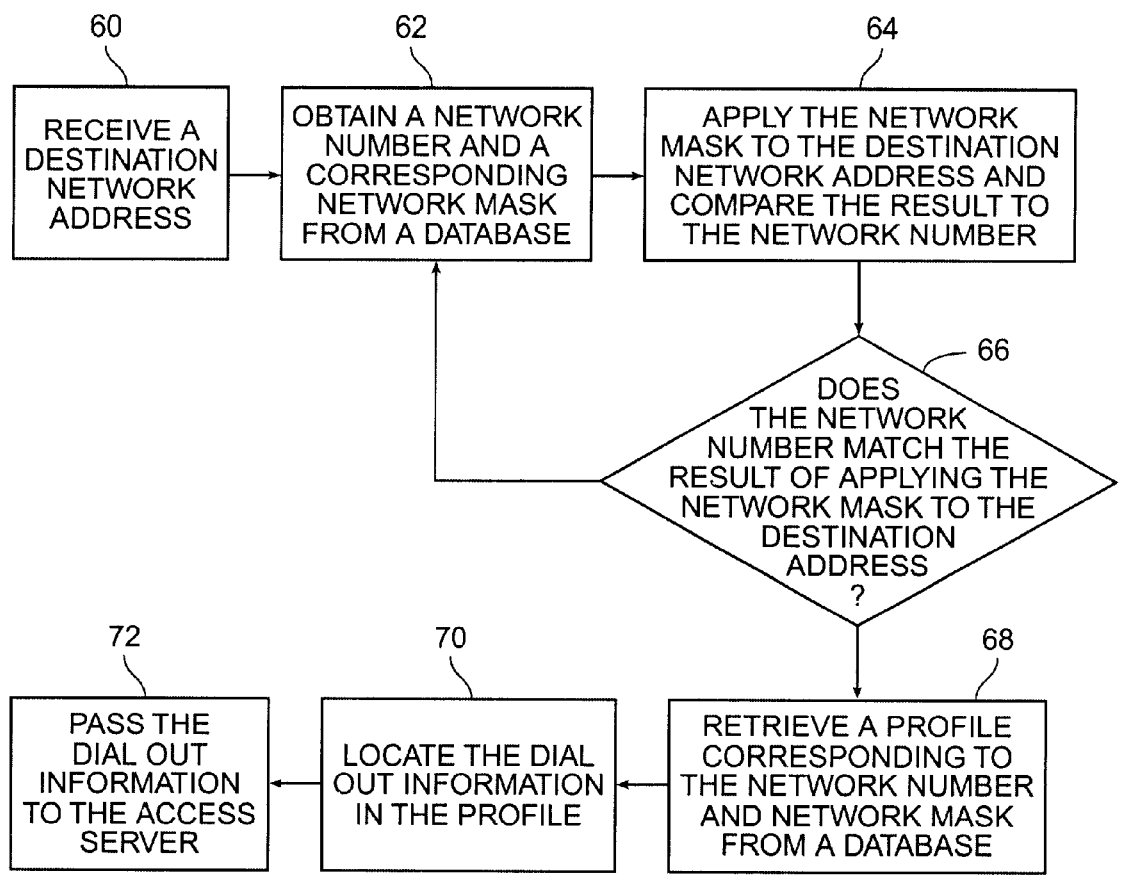
FIG. 5 is a flow diagram showing a method of using an authentication server to obtain dial-out information on a network in accordance with a presently preferred embodiment of the present invention.

The presently preferred embodiment of the invention involves a system where the dial-out information for a particular network is stored in a database in a profile corresponding to the particular network. This profile may then be retrieved in accordance with the present invention. FIG. 5 depicts a method for obtaining dial-out information from an authentication server in accordance with a presently preferred embodiment of the present invention. At step 60, the destination IP address is received. Normally, the destination IP address would have originally been received by the access server, which would then pass it to the authentication server. At step 62, the authentication server obtains a network number and a corresponding network mask from a database. This pair will normally be contained in a profile which also contains the dial-out information which will be used later. Therefore, step 62 will normally include retrieving a profile and holding that profile in some sort of memory store in case the profile turns out to be the correct one. However, the retrieval of many different profiles until a match is found can be very time consuming. Therefore, the designer may wish to store the network mask and number pairs in a separate database. This will result in having two separate profiles for each network number and network mask pair, one profile containing only the pair and a reference to a second profile, the second profile located in another database and containing the dial out information.

At step 64, the network mask is applied to the destination address and the result is compared to the network number. At step 66, if they do not match, the process moves back to step 62. If they do match, however, then the process moves to step 68 where a profile is retrieved from a database, the profile corresponding to the network number and network mask. Again, if the designer chooses to have each profile contain both the network number and network mask pair and the dial out information, then this step will really only involve referencing the profile that has already been retrieved. If, however, separate profiles are used, then this step involves retrieving the second profile from the separate database. It is also possible for each profile to contain multiple network number and mask pairs. This would occur in a situation where a network is assigned multiple network numbers.

At step 70, the dial out information in the profile is located. Then at step 72, this information may be passed to access server for use in dialing the network and passing the IP information to the network.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A computer system including:
   a first database queryer which obtains a network number and a corresponding network mask from a database;
   a de-masker which applies said network mask to a destination network address and compares the result to said network number;
   a second database queryer which retrieves a profile corresponding to said network number and said network mask from said database if said network number matches the result of applying said network mask to said destination network address; and
   a repeater which activates said first database queryer, said de-masker, and said second database queryer continuously until said network number matches the result of applying said network mask to said destination network address.

2. The computer system of claim 1, wherein said first database queryer includes:
   a profile remover which removes a profile from said database; and
   a profile reader which obtains a network number and a corresponding network mask from said profile.

3. The computer system of claim 2 wherein said first database queryer and said second database queryer retrieve the same profile.

4. The computer system of claim 1 wherein said profile may contain more than one pair of network numbers and corresponding network masks.

5. The computer system of claim 1 wherein said profile corresponding to said network number and said network mask contains dial out information.

6. The computer system of claim 5 wherein said dial out information includes a phone number.

7. The computer system of claim 1 further comprising:
a profile reader which locates dial out information in said profile.

8. The computer system of claim 5 further comprising:
means to forward said dial out information to an access server; and
means to forward said profile to said access server.

9. A computer system including:
determining if an information is a destination network address or a username;
a first database queryer which obtains a network number and a corresponding network mask from a database if said information is a destination network address;
a de-masker which applies said network mask to said destination network address and compares the result to said network number if said information is a destination network address;
retrieving a profile corresponding to said network number and network mask from a second database queryer if said network number matches the result of applying said network mask to said destination network address and if said information is a destination network address;
a repeater which activates said first database queryer, said de-masker, and said second database queryer continuously if said information is a destination network address until said network number matches the result of applying said network mask to said destination network address; and
a profile extractor which extracts a profile corresponding to said username from a database if said information is a username.

10. The computer system of claim 9 wherein said first database queryer includes:
removing a profile from said database; and
obtaining a network number and a corresponding network mask from said profile.

11. The computer system of claim 10 wherein said first database queryer and said second database queryer retrieve the same profile.

12. The computer system of claim 9 wherein said profile may contain more than one pair of network numbers and corresponding network masks.

13. The computer system of claim 9 wherein said profile corresponding to said network number and network mask contains dial out information.

14. The computer system of claim 13 wherein said dial out information includes a phone number.

15. The computer system of claim 9 further comprising:
a profile reader which locates dial out information in said profile.

16. The computer system of claim 9 further comprising:
means to forward said dial out information to an access server.

17. An apparatus to obtain dial-out information, comprising:
means for obtaining a network number and a corresponding network mask from a database;
means for applying said network mask to a destination network address and comparing the result to said network number;
means for retrieving a profile corresponding to said network number and said network mask from a database if said network number matches the result of applying said network mask to said destination network address; and
means for activating continuously said means for obtaining, said means for applying and comparing, and said means for retrieving until said network number matches the result of applying said network mask to said destination network address.

18. The apparatus of claim 17, further comprising:
means for removing a profile from said database; and
means for obtaining a network number and a corresponding network mask from said profile.

19. The apparatus of claim 18 wherein said means for removing and said means for retrieving obtain the same profile.

20. The apparatus of claim 17 wherein said profile may contain more than one pair of network numbers and corresponding network masks.

21. The apparatus of claim 17 wherein said profile corresponding to said network number and network mask contains dial out information.

22. The apparatus of claim 21 wherein said dial out information includes a phone number.

23. The apparatus of claim 17 further comprising:
means for locating dial out information in said profile.

24. The apparatus of claim 17 further comprising:
means to forward said dial out information to an access server; and
means to forward said profile to said access server.

25. An apparatus to obtain dial-out information, comprising:
means for determining if an information is a destination network address or a username;
means for obtaining a network number and a corresponding network mask from a database if said information is a destination network address;
means for applying said network mask to said destination network address and comparing the result to said network number if said information is a destination network address;
means for retrieving a profile corresponding to said network number and network mask from a database if said network number matches the result of applying said network mask to said destination network address and if said information is a destination network address;
means for continually activating said apparatus if said information is a destination network address until said network number matches the result of applying said network mask to said destination network address; and
means for extracting a profile corresponding to said username from said database if said information is a username.

26. The apparatus of claim 25 further comprising:
means for removing a profile from a database; and
means for obtaining a network number and a corresponding network mask from said profile.

27. The apparatus of claim 26 wherein said means for removing and said means for retrieving obtain the same profile.

28. The apparatus of claim 25 wherein said profile may contain more than one pair of network numbers and corresponding network masks.

29. The apparatus of claim 25 wherein said profile corresponding to said network number and network mask contains dial out information.

30. The apparatus of claim 29 wherein said dial out information includes a phone number.

31. The apparatus of claim 25 further comprising:

means for locating dial out information in said profile.

32. The apparatus of claim 25 further comprising:

means to forward said dial out information to an access server.

33. A method for obtaining dial out information, comprising the steps of:

obtaining a network number and a corresponding network mask from a database;

applying said network mask to a destination network address and comparing the result to said network number;

retrieving a profile corresponding to said network number and said network mask from a database if said network number matches the result of applying said network mask to said destination network address; and activating continuously said obtaining, applying, and retrieving steps until said network number matches the result of applying said network mask to said destination network address.

34. The method of claim 33, further comprising:

removing a profile from said database; and obtaining a network number and a corresponding network mask from said profile.

35. The method of claim 34 wherein said profile from said removing step and said profile from said retrieving step are the same profiles.

36. The method of claim 33 wherein said profile may contain more than one pair of network numbers and corresponding network masks.

37. The method of claim 33 wherein said profile corresponding to said network number and said network mask contains dial out information.

38. The method of claim 37 wherein said dial out information includes a phone number.

39. The method of claim 33 further comprising:

locating dial out information in said profile.

40. The method of claim 39 further comprising:

forwarding said dial out information to an access server; and forwarding said profile to said access server.

41. A method to obtain dial-out information, comprising:

determining if an information is a destination network address or a username;

obtaining a network number and a corresponding network mask from a database if said information is a destination network address;

applying said network mask to said destination network address and comparing the result to said network number if said information is a destination network address;

retrieving a profile corresponding to said network number and network mask from a database if said network number matches the result of applying said network mask to said destination network address and if said information is a destination network address;

activating said apparatus continually if said information is a destination network address until said network number matches the result of applying said network mask to said destination network address; and extracting a profile corresponding to said username from a database if said information is a username.

42. The method of claim 41 further comprising:

removing a profile from said database; and obtaining a network number and a corresponding network mask from said profile.

43. The method of claim 42 wherein said profile from said removing step and said profile from said retrieving step and are the same profile.

44. The method of claim 41 wherein said profile may contain more than one pair of network numbers and corresponding network masks.

45. The method of claim 41 wherein said profile corresponding to said network number and network mask contains dial out information.

46. The method of claim 45 wherein said dial out information includes a phone number.

47. The method of claim 41 further including the step of:

locating dial out information in said profile.

48. The method of claim 47 further including the step of:

forwarding said dial out information to an access server.

49. The method of claim 41 further including the step of:

forwarding said profile to an access server.

50. A program storage device readable by a machine, tangibly embodying a program of instructions executable by the machine to perform a method for obtaining dial out information, the method comprising:

obtaining a network number and a corresponding network mask from a database;

applying said network mask to a destination network address and compares the result to said network number; and retrieving a profile corresponding to said network number and network mask from a database if said network number matches the result of applying said network mask to said destination network address.

51. A program storage device readable by a machine, tangibly embodying a program of instructions executable by the machine to perform a method for obtaining dial out information, the method comprising:

determining if an information is a destination network address or a username;

obtaining a network number and a corresponding network mask from a database if said information is a destination network address;

applying said network mask to said destination network address and comparing the result to said network number if said information is a destination network address;

retrieving a profile corresponding to said network number and network mask from a database if said network number matches the result of applying said network mask to said destination network address and if said information is a destination network address;

activating said apparatus continually if said information is a destination network address until said network number matches the result of applying said network mask to said destination network address; and extracting a profile corresponding to said username from a database if said information is a username.

* * * * *